(12) United States Patent
Gallagher et al.

(10) Patent No.: US 8,271,266 B2
(45) Date of Patent: Sep. 18, 2012

(54) MEDIA CONTENT ASSESSMENT AND CONTROL SYSTEMS

(75) Inventors: Daniel Gerard Gallagher, Portland, OR (US); Jia Lin, Seattle, WA (US); Marc Stoffregen, Sherwood, OR (US)

(73) Assignee: Waggner Edstrom Worldwide, Inc., Lakeoswego, OR (US)

( * ) Notice: Subject to any disclaimer, the term of this patent is extended or adjusted under 35 U.S.C. 154(b) by 1286 days.

(21) Appl. No.: 11/846,866

(22) Filed: Aug. 29, 2007

(65) Prior Publication Data

US 2009/0063134 A1    Mar. 5, 2009

Related U.S. Application Data

(60) Provisional application No. 60/824,111, filed on Aug. 31, 2006.

(51) Int. Cl.
 *G06F 17/21* (2006.01)
(52) U.S. Cl. ............. 704/10; 704/203; 704/2; 375/295; 375/169; 707/714; 709/204; 709/206; 715/853
(58) Field of Classification Search ............. 704/2, 203, 704/10; 709/206, 204; 702/19; 715/853; 707/714; 706/45; 375/295; 345/169
See application file for complete search history.

(56) References Cited

U.S. PATENT DOCUMENTS

| | | | |
|---|---|---|---|
| 4,930,077 A | | 5/1990 | Fan |
| 5,907,836 A | | 5/1999 | Sumita et al. |
| 6,611,825 B1 | * | 8/2003 | Billheimer et al. ............. 706/45 |
| 6,718,367 B1 | * | 4/2004 | Ayyadurai .................... 709/206 |
| 6,804,637 B1 | * | 10/2004 | Tokuda et al. .................... 704/2 |
| 7,003,516 B2 | | 2/2006 | Dehlinger et al. |
| 7,016,910 B2 | * | 3/2006 | Egilsson et al. ...................... 1/1 |
| 7,058,628 B1 | | 6/2006 | Page |
| 7,181,451 B2 | | 2/2007 | Dehlinger et al. |
| 7,216,123 B2 | | 5/2007 | Kamvar et al. |
| 7,243,092 B2 | | 7/2007 | Woehler et al. |
| 7,702,611 B2 | | 4/2010 | Chi et al. |
| 7,783,477 B2 | * | 8/2010 | D'Haes ......................... 704/203 |
| 7,961,809 B2 | * | 6/2011 | Bourdoux et al. ............ 375/295 |
| 2002/0154175 A1 | * | 10/2002 | Abello et al. ................. 345/853 |
| 2004/0054973 A1 | | 3/2004 | Yamamoto |
| 2004/0059565 A1 | | 3/2004 | Dehlinger et al. |
| 2005/0108001 A1 | * | 5/2005 | Aarskog ......................... 704/10 |
| 2005/0171948 A1 | * | 8/2005 | Knight ............................. 707/6 |

(Continued)

OTHER PUBLICATIONS

Newman D.,Chemudugunta C.,Smyth P.,Steyvers M.,"Analyzing Entities and Topics in News Articles Using Statistical Topic Models," ISI 2006,LNCS 3975,pp. 94-104, Irvine, CA.

(Continued)

*Primary Examiner* — Michael Colucci

(74) *Attorney, Agent, or Firm* — Michael Blaine Brooks, P.C.; Pejman Yedidsion; Christopher F. Weiss

(57) ABSTRACT

Computer implemented methods and computing systems wherein relationships of words or phrases within a textual corpus are assessed via frequencies of occurrence of particular words or phrases and via frequencies of co-occurrence of particular pairs of words or phrases within defined tracts of text from within the textual corpus.

15 Claims, 11 Drawing Sheets

U.S. PATENT DOCUMENTS

| | | | |
|---|---|---|---|
| 2006/0129382 A1 | 6/2006 | Anand et al. | |
| 2006/0259481 A1* | 11/2006 | Handley | 707/5 |
| 2008/0266263 A1* | 10/2008 | Motaparti et al. | 345/169 |
| 2009/0063134 A1* | 3/2009 | Gallagher et al. | 704/10 |
| 2009/0070101 A1 | 3/2009 | Masuyama et al. | |
| 2011/0113095 A1* | 5/2011 | Hatami-Hanza | 709/204 |
| 2011/0196857 A1* | 8/2011 | Chen et al. | 707/714 |

OTHER PUBLICATIONS

International Search Report for PCT/US2007/077286 dated Nov. 24, 2008.

Nonfinal Office Action for U.S. Appl. No. 12/392,320 mailed Mar. 8, 2012.

* cited by examiner

|    | W1 | W2 | W3 | WN |
|----|----|----|----|----|
| W1 | WF(1,1) 710 | [SF(1,2), PF(1,2)] | [SF(1,3), PF(1,3)] | [SF(1,N), PF(1,N)] |
| W2 |    | WF(2,2) 711 | [SF(2,3), PF(2,3)] | [SF(2,N), PF(2,N)] |
| W3 |    |    | WF(3,3) 712 | [SF(3,N), PF(3,N)] |
| WN |    |    |    | WF(N,N) 713 |

<u>For Media Set 1: Applying Exemplary Method</u>

Weight for Sentence Co-Occurrence = WS
Weight for Paragraph Co-Occurrence = WP

WF(KW1) = 6
WF(KW2) = 3
WF(KW3) = 5

SF(KW1,KW2) = 2
PF(KW1,KW2) = 3
W(1,2) = WS*2+WP*3

SF(KW1,KW3) = 3
PF(KW1,KW3) = 4
W(1,3) = WS*2+WP*4

SF(KW2,KW3) = 2
PF(KW2,KW3) = 3
W(2,3) = WS*2+WP*3

W(2,1) = W(1,2)
W(3,1) = W(1,3)
W(3,2) = W(1,3)

For Media Set 1:
Exemplary Weighted Narrative Matrix

810

|      | KW1 | KW2 | KW3 | KWN |
|------|-----|-----|-----|-----|
| KW1  | 6   | $W_{1,2}$ | $W_{1,3}$ | $W_{1,N}$ |
| KW2  | $W_{2,1}$ | 3 | $W_{2,3}$ | $W_{2,N}$ |
| KW3  | $W_{3,1}$ | $W_{3,2}$ | 5 | $W_{3,N}$ |
| KWN  | $W_{N,1}$ | $W_{N,2}$ | $W_{N,3}$ | $WF_N$ |

FIG. 8

For Media Set 1: Exemplary Numerically Weighted Narrative

Example Weight for WS = 2
Example Weight for WP = 1

Matrix

|     | KW1 | KW2 | KW3 |
|-----|-----|-----|-----|
| KW1 | 6   | 7   | 8   |
| KW2 | 7   | 3   | 7   |
| KW3 | 8   | 7   | 5   |

MEDIA CONTENT ASSESSMENT AND CONTROL SYSTEMS

CROSS-REFERENCE TO RELATED APPLICATIONS

This application claims the benefit of U.S. Provisional Application No. 60/824,111, filed, Aug. 31, 2006, and is related to U.S. Nonprovisional patent application Ser. No. 12/392,320 filed Feb. 25, 2009.

FIELD OF ENDEAVOR

The invention, in its several embodiments, pertains to assessing the frequency and contextual properties of text in a multiple source environment and to tracking and effecting changes in the frequency and contextual properties of text in the multiple source environment and particularly, to methods, devices, and systems for assessing the frequency and contextual properties of a portion of the text present in the multiple source network, and also particularly pertains to methods, devices, and systems for tracking and effecting changes in the frequency and contextual properties of such a portion.

BACKGROUND

Relational databases of documents may be organized according to a weighted directed graph (i.e., weighted digraph) model where the most frequently accessed documents and/or the predictably most frequently accessed documents are characterized as nodes having weights higher than those nodes representing documents less frequently accessed and/or predictably less frequently accessed. Documents may be related by internally citing to one another and/or via a third or more documents and may be related by relational rules of the database within which they reside. The frequency of these cross-citations of documents and/or predictable frequency of cross-citations of documents may be represented by weighted links between the nodes. The weighted digraph may be represented for purposes of computer process as an adjacency matrix of documents comprising the state vector, where the nodal weights are expressed along the main diagonal of the adjacency matrix and the weighted links between pairs of nodes may be expressed via the off-diagonal terms of the adjacency matrix.

SUMMARY

The present invention, in its several embodiments includes computer implemented methods, computing systems, computing networks including client-server systems where textual material is identified as a reference source or textual corpus and the relationships of words or phrases within the textual corpus are assessed via frequencies of occurrence of particular words or phrases and via frequencies of co-occurrence of the particular pairs of words and/or phrases within defined tracts or lengths of text from within the textual corpus. The resulting occurrence and co-occurrence frequencies may then be weighed and compiled in a weighted adjacency matrix supportive of a digraph depiction. With respect to the textual corpus, the diameters of the nodes of the digraph depiction may be sized to represent their relative frequency of occurrence and the links or arc between the nodes may be sized in thickness and/or length to reflect a relative co-occurrence of the words represented by the linked nodes used of the digraph. The co-occurrence value may be based on frequencies of word pairs within a defined tract of text, e.g., a sentence or a paragraph. When two or more length definitions are used, the frequency of occurrence values may be a weighted combination. The words to which frequencies are counted may be defined as keywords and may be selected from a word found to occur at high frequency within the textual corpus, particularly those having narrow construction given the context of the textual corpus. In some embodiments, matrix elements and/or digraph nodes and links may be periodically re-characterized and compared with past characterization in order to assess possible effects of text offered in the mean time to the sources of the textual corpus. In some embodiments, matrix elements and/or digraph nodes and links may be periodically re-characterized and compared with a goal characterization in order to assess effects of text that may be offered in the mean time to the sources of the textual corpus.

Another exemplary computer implemented method embodiment includes: (a) selecting a set of initial text publishers comprising at least one text publisher; (b) defining a textual corpus comprising at least one textual output from a publisher of the selected set of initial publishers; (c) providing the target state of the textual corpus comprising: (i) a set of initial keywords; each initial keyword including a subset comprising an associated initial keyword frequency of occurrence from within the defined textual corpus; (ii) a set of frequencies of within-sentence co-occurrence of pairs of initial keywords from within the defined textual corpus; and (iii) a set of frequencies of within-paragraph co-occurrence of pairs of initial keywords from within the defined textual corpus; (d) deriving from the textual corpus the assessed textual corpus state comprising parsing the textual corpus and filtering the parsed textual corpus yielding the assessed textual corpus state comprising: (i) a set of derived keywords; each derived keyword including a subset comprising an associated derived keyword frequency of occurrence within the defined textual corpus; (ii) optionally, a set of high-frequency words; each high-frequency word including an associated high-frequency word frequency of occurrence within the defined textual corpus; (iii) a set of frequencies of within-a-tract co-occurrence of pairs of words within a tract of the defined textual corpus; (e) generating a difference, e.g. a difference vector or difference matrix, based on differencing at least one of: (a) the keyword frequency subset and the initial keyword frequency subset and (b) the set co-occurrence of pairs of keywords within a defined tract of text; and (f) transmitting a textual input for the selected set of initial text publishers based on the difference. Some method embodiments may further comprise adding to the initial keywords at least one high-frequency word and repeating the steps of deriving from the textual corpus the assessed textual corpus state; generating a new difference; and transmitting an new textual input for the selected set of initial text publishers based on the difference. Some method embodiments may perturbate an on-going generation of the textual corpus to adjust the selected media to better propagate future textual input of the user. Accordingly some method embodiments, after selecting a set of initial text publishers comprising at least one text publisher, comprise: transmitting a test textual input to the selected set of initial text publishers; sampling output of at least one of the initial text publishers of the selected set of initial text publishers; sampling output of a set of second tier text publishers; differencing the state of the test textual input and the state of the output of the initial text publishers and deriving a fidelity index; differencing the sampled output state of the initial text publishers and the state of the second tier publishers and deriving a propagation index; and eliminating from the set of initial text publishers at least one initial text publisher based on at least one of: the associated fidelity index and the associated propagation index.

Computing means include a processor, addressable memory and computer-executable instructions and/or circuits for performing one or more of the functions described in the present disclosure. That is, the exemplary method embodiments of the present invention may be performed by computing means executing steps as provided in executable computer code. In client-server systems, the client may define initially or continually the textual corpus, may redefine keywords, may instruct the server as to optional parsing and weighting functions, and may monitor changes in the elements of a characterizing matrix and/or digraph.

BRIEF DESCRIPTION OF THE DRAWINGS

The present invention is illustrated by way of example and not limitation in the figures of the accompanying drawings, and in which:

FIG. 7A is an exemplary weighted adjacency matrix structure having multivariable off-diagonal terms;

FIG. 7B is a table of exemplary values for the matrix of FIG. 7A;

FIG. 8 is a table of exemplary values for a weighted narrative matrix;

FIG. 9 is a table of exemplary values for a weighted narrative matrix;

DETAILED DESCRIPTION

Figure 1:
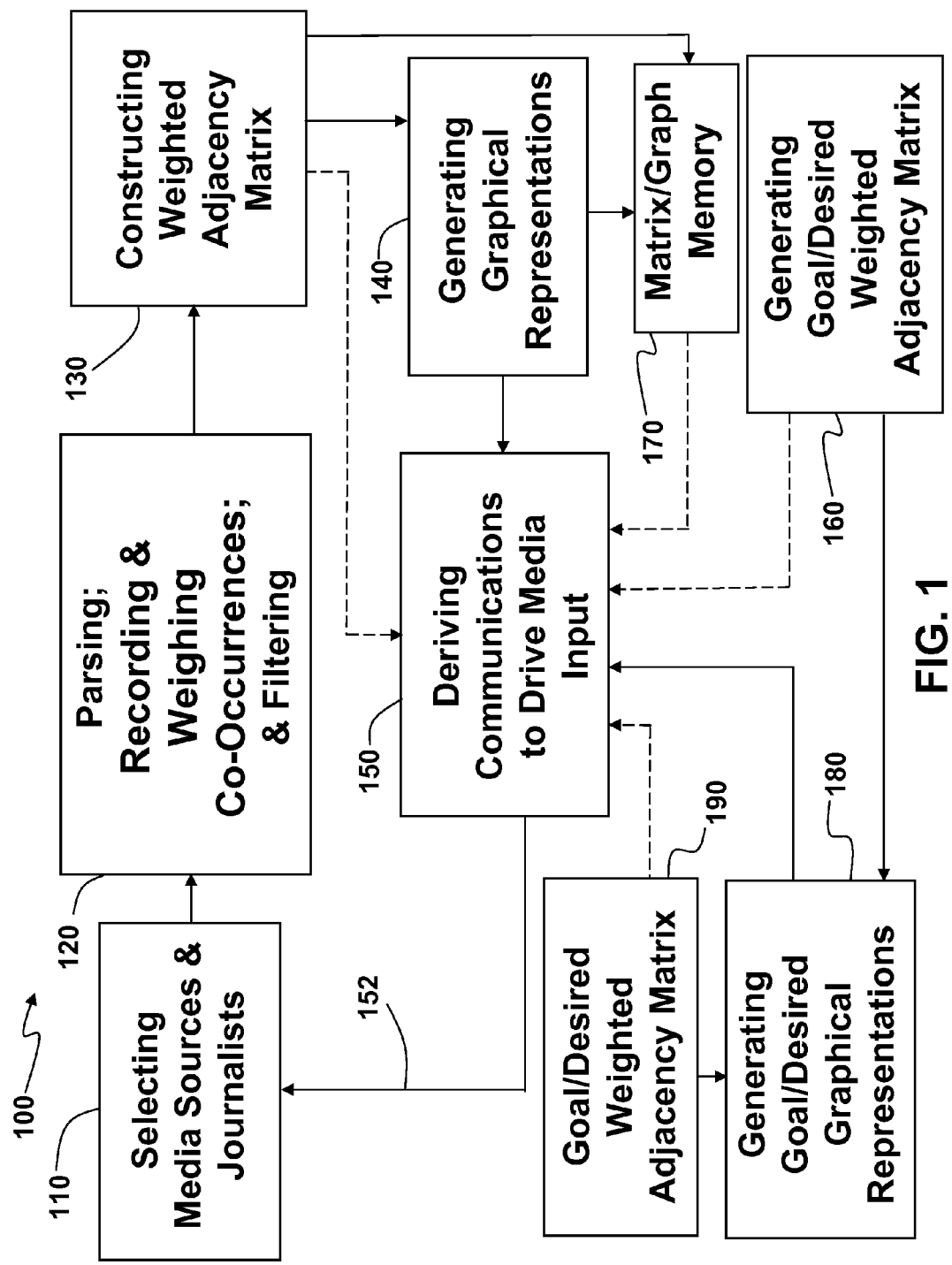
FIG. 1 is a functional block diagram of an exemplary embodiment of the present invention.

The present invention, in its several embodiments, includes deriving word and phrase relationships as they may be presented in selected third-party media, deriving relationship representations based on frequencies and types of word/phase co-occurrences, and determining a portion of source input content for third-party media based on the derived relationship representations. The exemplary methods described herein may be implemented in a computing system, a computer or a computer network including a client-server network. A computer or computing system comprises a processor and addressable memory whereby the processor executes computer-readable instruction representative of the one or more steps of the exemplary embodiments. A computer network comprising two or more computing systems coupled by a network link whereby data and/or instruction generated by one computing system in the course of executing one or more steps of the method embodiments of the present invention may be transmitted to another computing system via the network link.

The present invention, in its several embodiments, may include the mining and mapping of text extracted from online or offline media content, e.g., from newspaper articles to user-generated posts in the body of web page based communication that may be termed the blogosphere. Interrelationships of extracted text may be quantified in a multivariable format and may be represented in graphical maps to visually display the interrelationships. The displayed interrelationships may provide a basis for a discerning characterization of the media portrayal of a particular brand, service or personality addressed by the media subject to the mining and mapping and may be compared over successive mining and mapping steps to discern changes in the characterization.

In the public relations and advertising industries, in devising brand communications strategy and messaging, one may conduct an extensive media coverage analysis. Typically the intent of the media coverage analysis is to determine what the media says about a particular brand and, importantly, what the media says about the brand in the context of the competition. A media coverage analysis may be characterized as secondary research that is often used in conjunction with primary market research among brand users and non-users. Both forms of research help communications professionals determine an improved market positioning for a brand and distill messages that may be necessary in support of that brand position and image.

A media coverage analysis generally involves using databases such as Factiva™ and Nexis™ that contain terabytes of text pertaining to various subjects. A typical media coverage analysis involves searching for relevant content in online and offline media dating back one year and, depending upon the popularity of the subject, may include media dating further than one year back from the present. Output from a media coverage search usually involves several hundred pages of relevant text from publications, such as *The New York Times*, the *Wall Street Journal* and research from various industry analysts, market research companies and from financial services firms. As an example, a Factiva™ search of media coverage during the calendar year 2005 relating to a major computer software company yielded over 42,000 articles in the media totaling roughly 128 gigabytes of text.

While what is written about a particular brand is made readily available via a simple keyword search via a commercial search engine such as Google™, the sheer volume of search results may preclude a rapid review of the text output to quickly determine the media narrative, i.e., the interrelated nature of keywords characterizing the subject of the search, that may be contained in several hundred articles of text. With the use of a computer-aided single human media reviewer or several human media reviewers, a methodology is needed to parse the text in the media and map the interrelationships of the most frequently occurring terms that readily represent a characterization of the subject in which the media may be applied. The media analysis methodology embodiments of the present invention fulfill the market need to quantify words and phrases associated with a particular topic and then may map the strength of relationships between those words as a weighted adjacency matrix and network displays. Mappings and differences between present and past mappings and/or between present target, or goal, mapping may be used to generate press releases, for example, for selected media coverage.

An exemplary embodiment of the present invention may include a process having five phases. FIG. 1 illustrates this process 100 via a functional block diagram. The first phase 110 includes one or more steps of identifying media having textual content for parsing. The second phase 120 includes one or more steps pertaining to parsing the media thereby obtaining for each parsed media the frequency of words and co-occurrence frequencies of words, and in some embodiments, phrases and may further include one or more steps of filtering words from the parsed set of words. The third phase 130 includes one or more steps applying weights particularly to co-occurrence frequencies where the weight may vary according to the relative importance of the proximity to each other of the co-occurring words, e.g., the fewer interposed words, the higher the weight that may be applied to the co-occurrence frequency count. The fourth phase 140 may include displaying the filtered word and weighted co-occurrences and in a multivariable table or matrix, e.g., a weighted adjacency matrix, and may include displaying the filtered and weighted words as a nodal network where nodes represent the words and the arcs or network links represent strength of the connection between the words where strength is defined relatively and according to the weighted co-occurrence of words resulting from the parsed media. The fifth phase 150 may include a comparison of the displayed results with previously generated goals 160 or a previous-in-time display/matrix results 170, where the difference may be used to drive the injection or motivate the inducement of words and co-occurrences in the future media output as selected in the first phase 110 and parsed in the second phase 120 of a future exercise, i.e., iterative loop, of the phases. Accordingly, exemplary press releases or other communication 152 based on the comparisons 150 may be sent to selected publishers 110, i.e., media sources and journalists, to drive the assessed textual corpus, whether graphical 140 or in matrix form 160 toward the graphical 180 or matrix 190 goals.

Accordingly, FIG. 1 illustrates two exemplary embodiments of the present invention. The first exemplary embodiment includes: (a) selecting the media sources and journalists; (b) parsing and filtering the textual media of the selected media; (c) recording the frequency of the filtered keywords and their co-occurrences, typically according to proximity metrics, and applying weights to the co-occurrence frequency according to proximity type; (d) constructing a weighted adjacency matrix representative of the frequency of the keywords along the main diagonal and weighted co-occurrence pairs in the off-diagonal pairs; (e) generating a graphical representation of the relationship of the keywords and their co-occurrences according to the weighted adjacency matrix; (f) deriving communication content as prospective media input to effect change in future media output where the derivation may be based on the comparison of the generated graphical representation with a generated goal or desired graphical representation—typically addressing the differences between the two in what may be termed a difference matrix containing occurrence and co-occurrence value differences. In a second exemplary embodiment, the derivation may be based on the comparison of the constructed weighted adjacency matrix with a generated goal or desired weighted adjacency matrix—again, typically addressing the differences between the two again in what may be termed a difference matrix containing occurrence and co-occurrence value differences.

First Phase

An example of the first phase 110 may include the selection of media outlets. The journalists of particular media outlets that may be read and to some degree relied upon by a sufficient quantity of those persons in the target field which may be termed "influentials." Within the influentials, a portion of the influentials may be considered by those persons in the target field to possess significant gravitas or produce sufficiently researched articles as to be looked to as a bellwether as to matters particularly relevant to the target field which may be termed "impactful." Accordingly, a general rule that may be applied as part of the first phase 110 includes one or more steps for determining the media outlets for parsing based on those published media of influentials that are most impactful for the user.

Particularly impactful influentials and their media outlets may be determined by quantitative and qualitative research. For example, a research team or query agent may audit the user to determine the means and communication channels through which the user, as a representative of the target field, consumes media and a research team or query agent may audit the user to ascertain, from the user's perspective, which journalists among the various media are most impactful. In addition, surveys by a research team, or query agent, of consumers (e.g., on behalf of prospective users that may be manufacturers, wholesalers, and retailers) and/or target audiences comprised of persons operating in some fashion within the target field may be conducted, in order to determine which journalists among the media outlets are most impactful.

Top Ten Approach

Field surveys can be expensive and for those clients unable to fund in-depth determinations of impactful influentials, such customized and detailed investigation cannot be supported. A pre-selected or readily determinable number of media outlets may be identified without the use of a field survey. For example, if a user has limited budget for an investigation, e.g. via a research team or query agent, of the most impactful influentials, the user may draw from the analysis of the top, e.g., ten, outlets for their sector or target field. The top ten outlets may be determined both by available data of the outlet regarding readership, sales, degree of reliance by members of the target sector o field (e.g., as may be evidenced by citations made to the particular outlet as motivation or rationale for a statement or action), and by an expert such as a public relations professional's experience in knowing which publications are leading in having journalists of note (i.e., impactful influentials) in certain sectors (e.g., Wall Street Journal is always one of the top business publications).

Impactful Influentials Determined by Parsing and Linking Results

The on-line application of the parsing web pages and relating parsed words may yield impactful influentials by gathering existing coverage, which may include the degree to which the various web pages may be linked and returning a multivariable representation of the frequently accessed pages and may include a click-through trail. An expert filter may be applied during this portion, in order remove pages deemed unreliable, inaccurate or misleading. Accordingly, the user or expert agent may include media, particularly from on-line media in web pages adapted for linking, from automatically determined impactful influentials.

Selection of Key Words

The user may wish to increase the appearance in the media produced by the impactful influentials of a brand or business name with a word or words that, when taken together, may set a theme, that is words that may consistently co-occur within the writings of the impactful influentials. The word or words may be selected by the user or determined by the user in conjunction with one or more public relation experts or reference materials. For example, the theme represented by the combination of a product, a speaker system, a stock price and other descriptive words may be established as a targeted result in the target sector or field. By selecting the initial key words for the topic search, the initial key words, to the extent they relate to the theme, for the initial indexes (of a matrix) and node (of a network) that may be the foundation of a narrative network map.

For example, in searching for media coverage/text related to Samsung™, the user or expert agent may choose the Major News and Business Publications list of Factiva™ and enter the following key words: "Samsung; consumer electronics; semiconductors; wireless; cell phones; televisions and LCDs" because the user or expert agent has prior knowledge that Samsung™ conducted business in each of those industries. To narrow the search to consumer electronics, the user or expert agent may apply Boolean logic search: "Samsung" and "consumer electronics."

Figure 2:
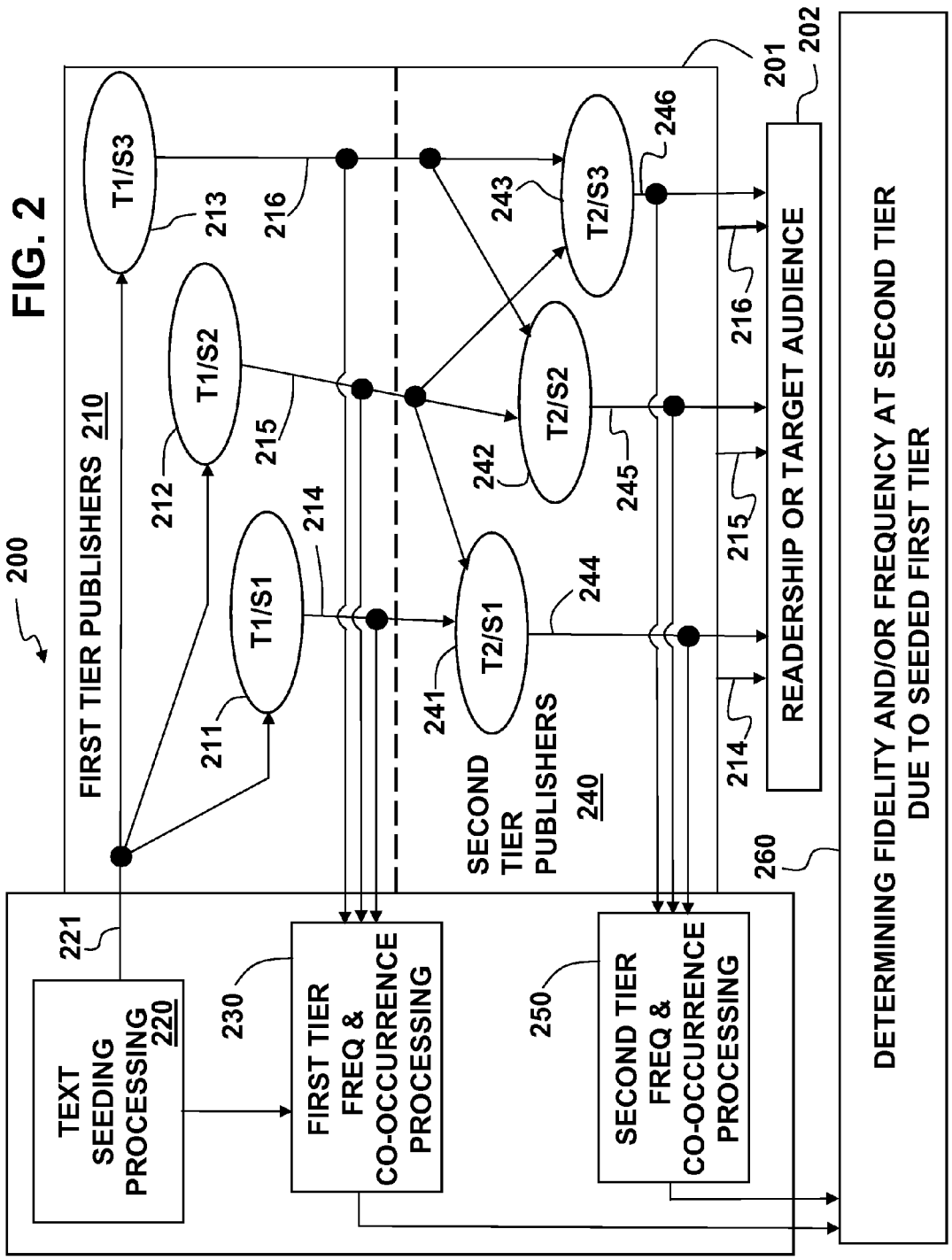
FIG. 2 is a functional block diagram of an exemplary sub-process embodiment of the present invention.

FIG. 2 is an exemplary functional block diagram illustrating a computer implemented method 200 for determining effective publishers within a textual corpus 201 for purposes of directing text derived to change the textual corpus, i.e., directing text seeds. In this example, the textual corpus 201 may be defined by the selected readership of target audience 202. Processing such as the text seeding processing 220 may identify one or more first tier publishers 210 or tier 1 sources, e.g., T1/S1 211, T2/S2 212, and T1/S3 213, understood to be tentatively the influentials in the particular textual corpus 201 and after identification, transmit the one or more text seeds 221. The subsequent output 214-216 of the selected first tier publishers may be sampled and assessed 230 for frequency of keywords and may be assessed for selected keyword co-occurrences using, for example, the process teaching of the present disclosure, in order to determine by comparison the reproductive scope and reproductive fidelity of the selected first tier published. Processing such as the text seeding processing 220 may identify one or more second tier publishers 240 or tier 2 sources, e.g., T2/S1 241, T2/S2 242, and T2/S3 243, understood to be tentatively the influentials in the particular textual corpus 201. Second tier publishers 241-243 of the textual corpus 201 may pick up the output 214-216 of the seeded first tier 210 and the subsequent output of the second tier publishers 244-246 may be sampled and assessed 250 using, for example, the process teaching of the present disclosure to determine 260 the reproductive scope, e.g., extent of text re-published as may be represented by a rate, ratio or index of original and present material, and reproductive fidelity, e.g., co-occurrence and accuracy of phrases as may be represented by a rate, ratio or index of original and present material, of the selected second tier published 240 based on the first tier output 214-216 and may assess the propagation strength of particular first tier publishers 211-213 by focusing, for example, on the frequency and scope of reproduction of the first tier publishers in the second tier publisher output 244-246. A propagation index may be used where output of a first tier publisher may be attributable in the output of a second tier publisher, and a ratio or index comparing the attributable output at the two tiers may be generated.

Second Phase

The second phase may apply aspects of a social network analysis method to distill a characterization of a subject within a large-scale text body, which may be the textual corpus, by examining and quantifying the interrelationships of the keywords in the text. A keyword network may include nodes represented by the most frequently mentioned words in the text and the links represented by the count of the co-occurrence of each pair of keywords. An example of the second phase may include the user generating one or more keywords associated or otherwise representative of an entity and/or a product or service of the entity's field or market sector thereof. That is, search terms may be used to generate media, presumably from a database that, when searched, returns the indexed media most relevant to the search terms. The search engine could be personal, part of an intranet or other proprietary network or a web-based search engine. As search terms, the initial key words may then be entered into a media database, e.g., Factiva™. For example, the user or an expert agent may select for libraries, such as major news, business publications, internet and online publications and trade publications. The media returned from the database search may then be filtered according to user-defined thresholds for relevance or increased sensitivity to prospective relationship to be derived in the fifth phase. Exemplary rules for relevancy filtering include eliminating words that are substantially insensitive to prospective relationships. For example, words of generic meaning in the context of the returned list may be filtered from the list or words. A maximum number of total words may be used as a threshold and word thresholds may be applied to subsets, such as competitors, unrelated technologies and/or services, and words that may have multiple meanings in the context of the returned list of words. The filtered textual media may then be made available for processing according to the second phase.

Figure 3:
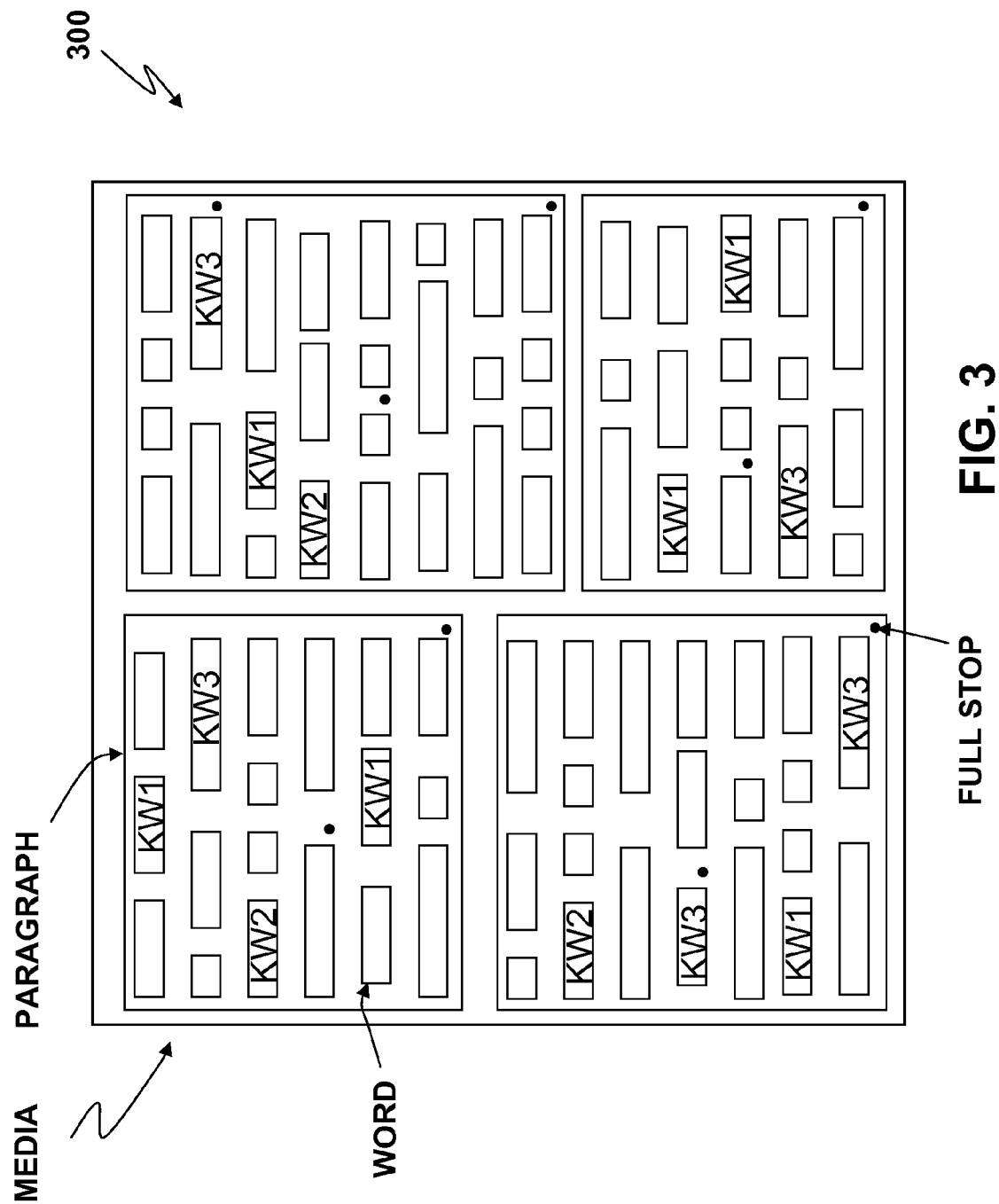
FIG. 3 is an exemplary textual corpus.
Figure 4:
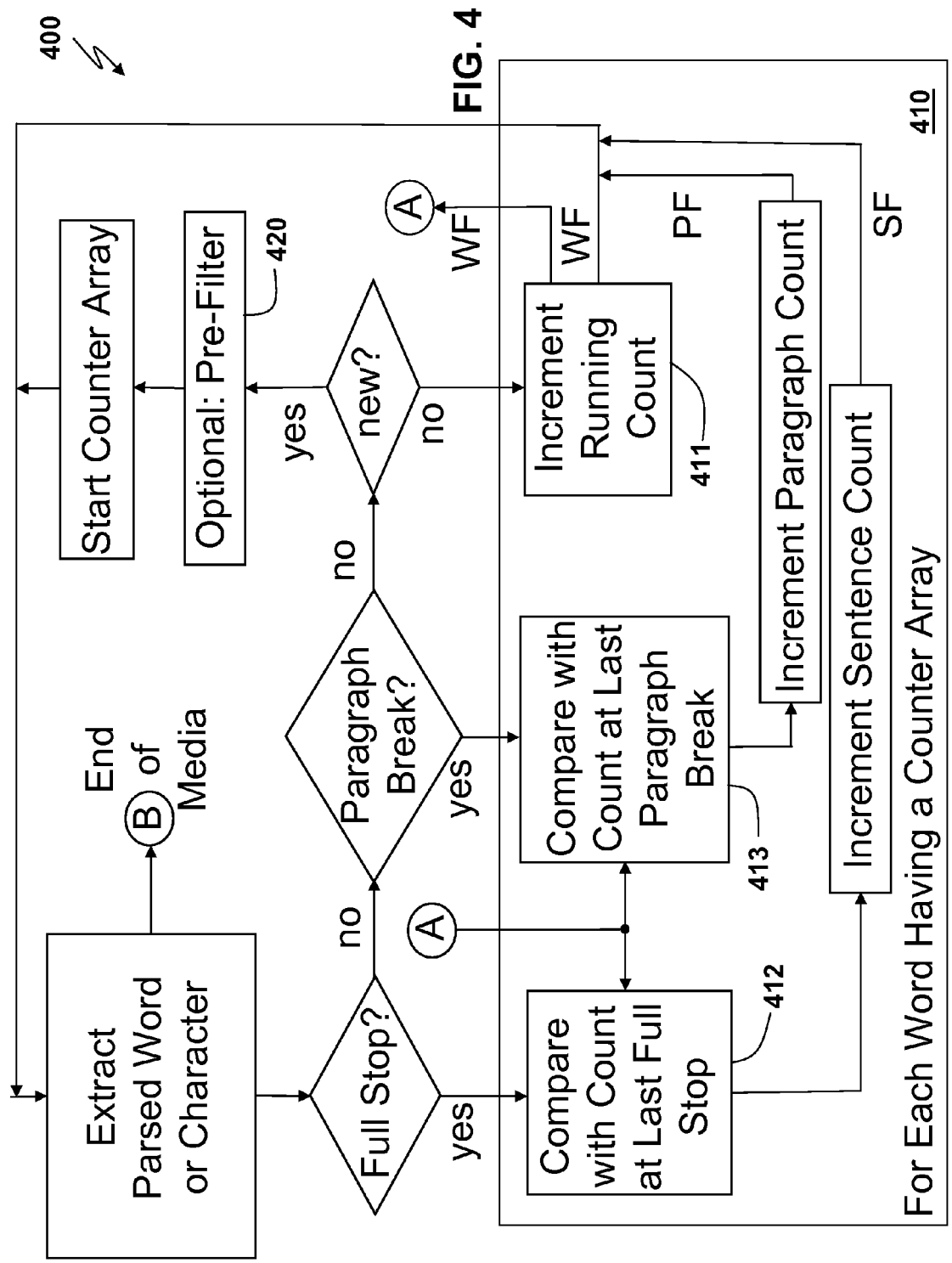
FIG. 4 is an exemplary top-level flowchart of a sub-process embodiment of the present invention.

From text media coverage, as represented in FIG. 3, as the textual corpus 300 having keywords KW1, KW2 and KW3, an example of a method of the present invention parses the text into words and may parse according to phrases, as well. The parsing of the identified media may be done so that extracted words are associated with their absolute locations within the media or may be extracted and recorded relative to one another. The former allows for a reconstruction of a filtered form of the original media while the later would allow for an abstraction of the original media. As illustrated by an exemplary flowchart 400 in FIG. 4, the parsing and determination operation may include a frequency counter 410 for each identified word or phrase that is repeated. This example counts word frequency (WF) 411 for word occurrence, and for co-occurrence, counts sentence frequency (SF) 412 and paragraph frequency (PF) 413. Proximity counts, such as within three words, or phrase counts and co-occurrences of phrase counts, e.g., sentence, paragraph, within specified word proximity, may also be included. The exemplary method may then rank all words in terms of frequency of occurrence. The parsing operation may pre-filter words 420 identified as common adjectives and pronouns so that they may not be made part of a list of parsed words. Rather than pre-filtering or in addition to pre-filtering, the list of words, phrases, or both, may be pared to delete frequently used words that may also include common adjectives and pronouns. From the pared-down word list, top or keywords may be selected for use in the next step of the exemplary process. Below, Table 1 is an example of the results of a first phase in the process using public media coverage of Google™ gathered during the second half of the calendar year 2005 and the exemplary computer-executable steps of parsing/frequency counting provided in the Appendix to the disclosure.

TABLE 1

| Keyword | |
|---|---|
| Google | 8470 |
| search | 2675 |
| Microsoft | 2202 |
| Internet | 2009 |
| Web | 1655 |
| Yahoo | 1419 |
| AOL | 1024 |
| online | 1007 |
| ads | 927 |

TABLE 1-continued

| Keyword | |
|---|---|
| users | 926 |
| service | 842 |
| stock | 814 |
| advertising | 803 |
| business | 792 |
| information | 770 |

The above table indicates that the word "Google" was mentioned 8,470 times in media coverage related to Google™ during the second half of 2005. Other frequently mentioned words relate to Google's core business of search, advertising and Google's key competitors, Microsoft™ and Yahoo!™.

The next sub-phase of the second phase of the exemplary process builds a keyword matrix to determine which pairs of words often appear together in the text. Below, Table 2 is part of the keyword matrix built for coverage on Google™.

TABLE 2

| Keyword | Google | search | Microsoft | Internet | Web | Yahoo | AOL | online | ads |
|---|---|---|---|---|---|---|---|---|---|
| Google | 8499 | 1764 | 1101 | 872 | 867 | 802 | 443 | 623 | 599 |
| Search | 1764 | 2891 | 452 | 485 | 575 | 438 | 193 | 328 | 349 |
| Microsoft | 1101 | 452 | 2200 | 323 | 247 | 397 | 257 | 196 | 83 |
| Internet | 872 | 485 | 323 | 2025 | 329 | 246 | 176 | 279 | 104 |
| Web | 867 | 575 | 247 | 329 | 1725 | 245 | 103 | 238 | 217 |
| Yahoo | 802 | 438 | 397 | 246 | 245 | 1418 | 163 | 186 | 158 |
| AOL | 443 | 193 | 257 | 176 | 103 | 163 | 1022 | 120 | 83 |
| Online | 623 | 328 | 196 | 279 | 238 | 186 | 120 | 1214 | 166 |
| Ads | 599 | 349 | 83 | 104 | 217 | 158 | 83 | 166 | 954 |
| Users | 573 | 354 | 140 | 219 | 250 | 153 | 68 | 146 | 83 |
| Service | 489 | 246 | 134 | 253 | 186 | 112 | 82 | 134 | 64 |
| Stock | 462 | 68 | 59 | 93 | 48 | 52 | 33 | 45 | 9 |
| advertising | 475 | 292 | 157 | 206 | 164 | 131 | 142 | 217 | 177 |
| Business | 423 | 191 | 162 | 181 | 144 | 93 | 76 | 109 | 79 |
| information | 440 | 234 | 77 | 133 | 175 | 80 | 14 | 83 | 34 |

Two keywords that appear within a text unit, i.e., a sentence or a paragraph, may be treated as being paired together in the media under analysis. In the above chart, the second phase of the process indicates the frequency of each of the keywords is paired together in the exemplary media coverage per each media unit. A keyword matrix in this exemplary embodiment is an undirected network that represents the co-occurrence frequency of any two keywords in a given text unit. A paragraph may be defined, for example, as text between two line breaks and a sentence may be defined as the unit between two periods, i.e., between two full stops. The co-occurrence frequency of the two keywords at a paragraph level or at a sentence level is the number of paragraphs or sentences that include both keywords. Therefore, this frequency assigns the value of links between each pair of keyword nodes that may be represented in a subsequent phase such as a nodal network graph of a narrative network. If two keywords never appear in any sentence or paragraph together, there is no entry (other than a placeholder entry of zero) in the cells of Table 2 representing a link between the keywords, and there would not be an arc or link between representations of these keywords as expressed in a graphical network for visualization of the outcome to user.

Figure 5:
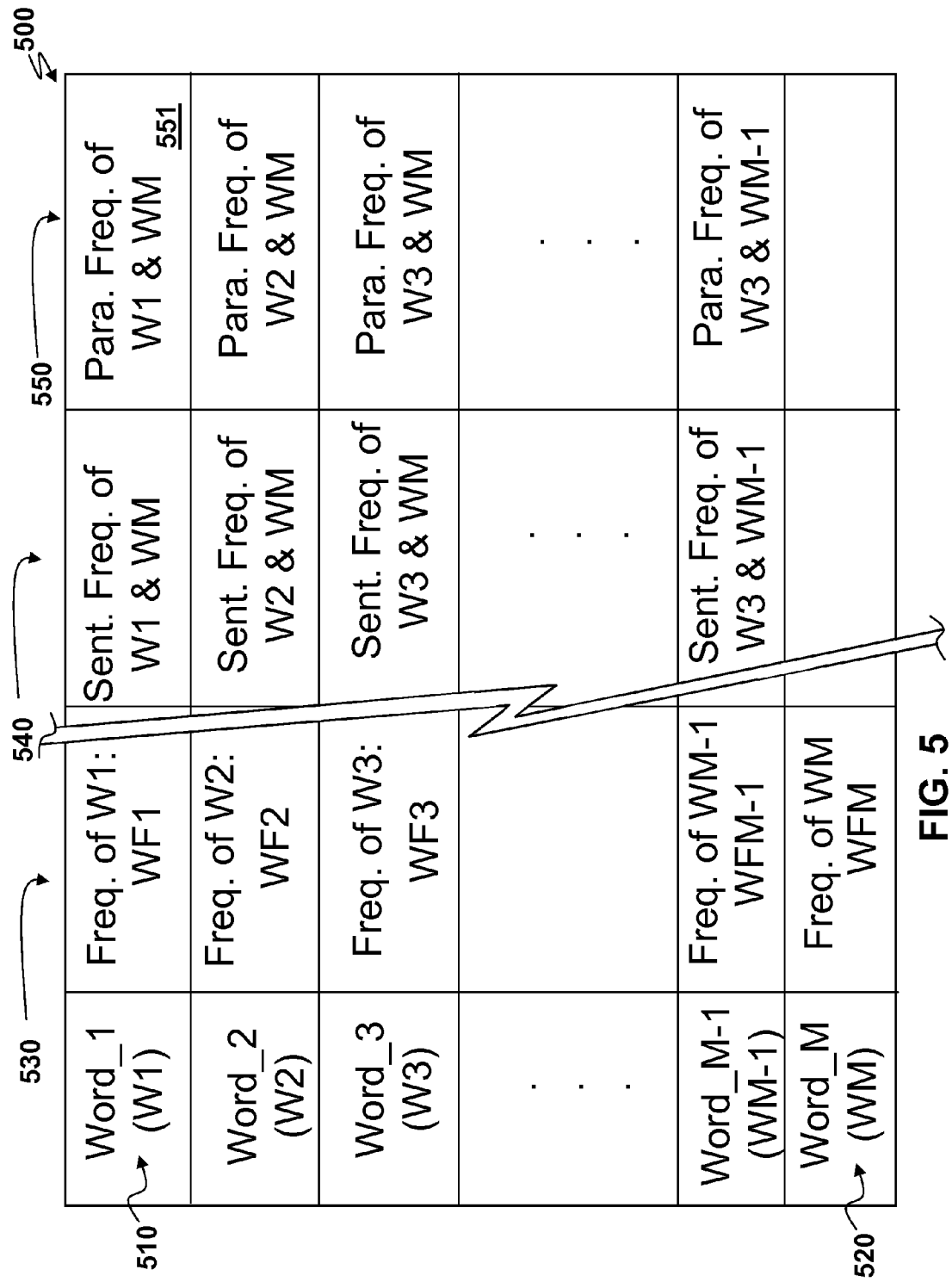
FIG. 5 is an exemplary table of word variables and co-occurrence variables of the present invention.

FIG. 5 illustrates another form of representation of the keyword matrix 500 as an array of frequency recordings: the word (WF1 to WFM), the sentence co-occurrence frequency and the paragraph co-occurrence frequency. FIG. 5 illustrates in a table or matrix, an exemplary word counter array having M number of words. So, the list of words is represented in the first column from the first word, "Word_1" or W1 510, to the last word, "Word_M or WM 520. The second column 530 comprises cells having values that represent the frequency count of each row-associated word, e.g., the word frequency of the first word may be represented at WF1. The co-occurrence columns 540, 550 each represent frequencies for a particular pair of words based on a proximity test for that particular column, e.g., within sentences 540 and within paragraph 550. Additional columns may be used for other proximity tests such as "within three words" and words may be replaced with phrases. So, for example, a value in the upper right cell 551 of the exemplary table represents frequency of co-occurrence, within the assessed textual corpus, of Word_1 and Word_M within paragraphs. The table of FIG. 5 is exemplary in its arrangement of rows and columns and may be transposed or row or column order rearranged without affecting the utility of the table or matrix so long as the association of words with their frequencies of occurrence and co-occurrence can be maintained.

Figure 6:
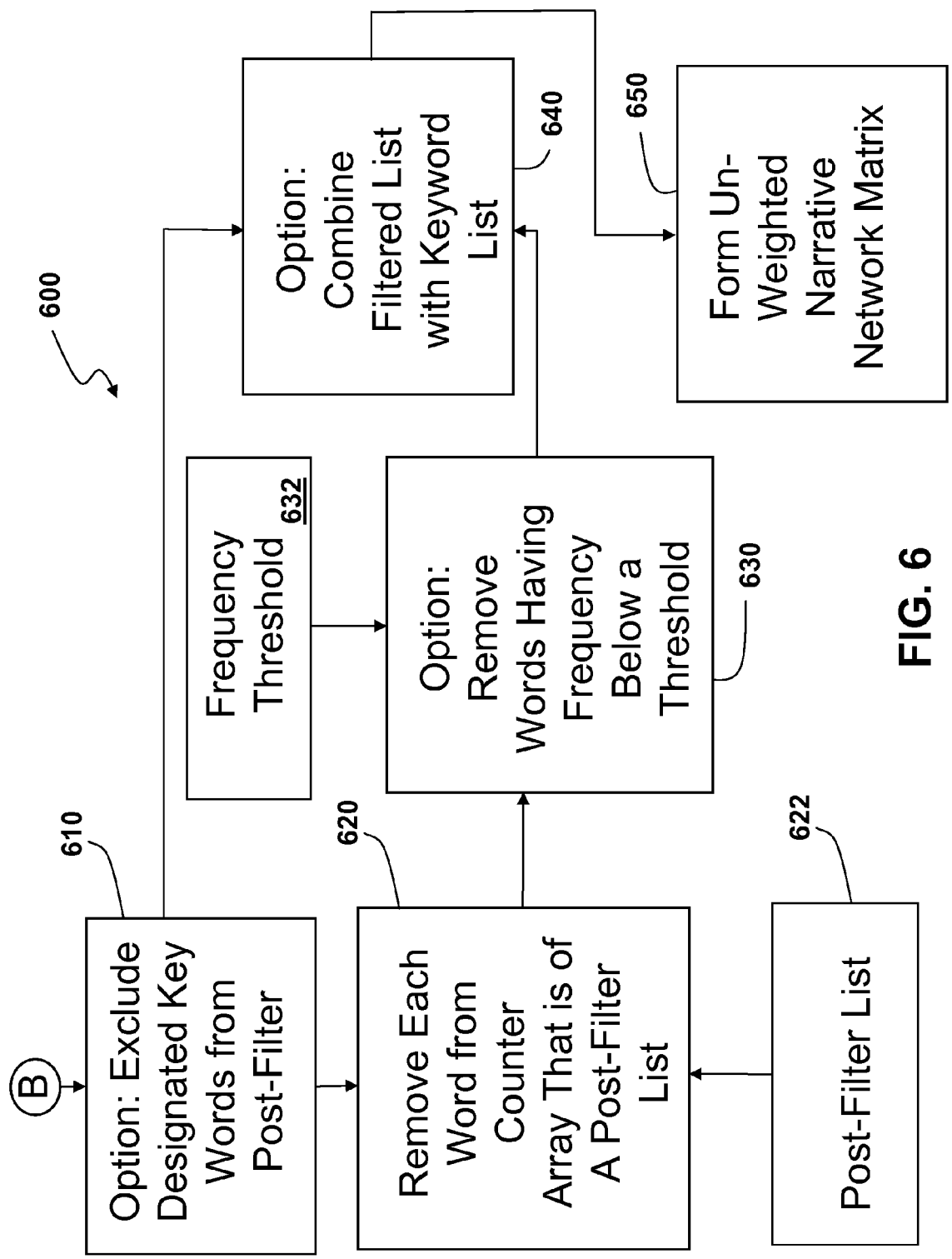
FIG. 6 is an exemplary top-level flowchart of a sub-process embodiment of the present invention.

Post-filtering and thresholding, i.e., testing and truncating based on a threshold, may be applied to this array, according to the exemplary sub-process 600 of FIG. 6. The exemplary top level flowchart of FIG. 6 illustrates that the process may optionally exclude designated, e.g., user-designated, key words from the post-filtering 610. The process may then remove 620 from the counter array or an un-weighted adjacency matrix words or phrases on the post-filter list 622. The user may have a threshold 632 below which the frequency of occurrence of words is insignificant 630 and accordingly set the processing to execute the thresholding. The threshold may be applied for classes of words or phrases of various values. For example, the phrase threshold may be much lower than the one or more word thresholds and the word thresholds may be set differently for adverbs (that may be identified typically by ending in "-ly") than for adjectives or gerunds or denominitive gerunds (that may identified typically by ending in "-ing"). Optionally, the filtered list and the keyword list may be combined 640 and the combination providing a vector that, when multiplied by the transposed vector, form an un-weighted, or yet-to-be-weighted, adjacency matrix, which may be termed a narrative network matrix 650. In this example, the off-diagonal terms of the narrative network matrix may be multivariable comprising one or more values of co-occurrence types.

Third Phase

The third phase of the process may assign values to co-occurrences of words, or phrases, which are found to be paired together, for example, in sentences, in paragraphs and in the entire article. An exemplary method of the present invention may assign values based on proximity of the word pair, sentence position of the word pair and paragraph position of the word pair. For example, keywords that are paired together in the same sentences, that is, co-occurring in the same sentences, are represented abstractly as an off-diagonal cell entry in an adjacency matrix or as an arc or link in a network graph, and may be assigned a higher value by way of weighting than weightings for the cells of links representing keywords paired, or co-occurring, in paragraphs. For example, the co-occurrence in one sentence will be weighted A, and the co-occurrence in one paragraph will be weighted B, where A>B. If word I and word J appear together in x (number of) sentences and y (number of) paragraphs (but not appear together in any sentence in these y paragraphs), the link weight between I and J, $w_{I,J}$, will be valued according to: $w_{I,J}=A*x+B*y$. Examples of applying weights are shown in FIGS. 7A, 7B, 8 and 9.

FIG. 7A shows an exemplary un-weighted adjacency matrix 700, or un-weighted narrative matrix, where the main diagonal cells 710-713 store the frequency of occurrence of words and the off-diagonal cells, of each row, store the paired frequency of co-occurrence of the word of the row, e.g., W1, and the word of the column, e.g., W2, of the within sentence type, i.e., SF(1,2) and the within paragraph type, i.e., PF(1,2). FIG. 7B shows a very simple example of a media set 1 (see FIG. 1) of the textual corpus applying an exemplary method of the present invention and the recorded frequencies thereof. The word frequencies (WF), sentence word pair co-occurrence frequencies (SF) and the paragraph word pair co-occurrence frequencies (PF) may be determined using relative or absolute reference parsing and counting and the exemplary media set 1 of FIG. 1. Absolute reference parsing refers to generally assigning a unique word location to each parsed word so that substantially a store of parsed words and associated locations could be used to substantially recreate the source text and can abstractly be used to count occurrences of words generate combinations and counts of word-pair differences. Relative reference parsing refers generally to tracking parsed word counts relative to most recently parsed selected words and the relative counts may abstractly be used to count occurrences of parsed words and to generate classes of word-pair proximities where the classes may be based on characters such as full stop (for sentences) and carriage return (for paragraphs).

FIG. 8 shows a listing 800 of exemplary weighting of the sentence and paragraph frequency of occurrences for keywords (KW) 1 through 3, i.e., KW1-KW3 of FIG. 3, where the results may be placed in the associated off-diagonal cells of a weighted adjacency matrix, or weighted narrative matrix 810. The exemplary sentence weights (WS) are applied to the sentence co-occurrence frequencies and the exemplary paragraphs weights (WP) are applied to the paragraph co-occurrence frequencies. FIG. 9 illustrates the completed exemplary computations 900 with the numerical results entered into the exemplary weighted narrative matrix 910.

Fourth Phase

Figure 10:
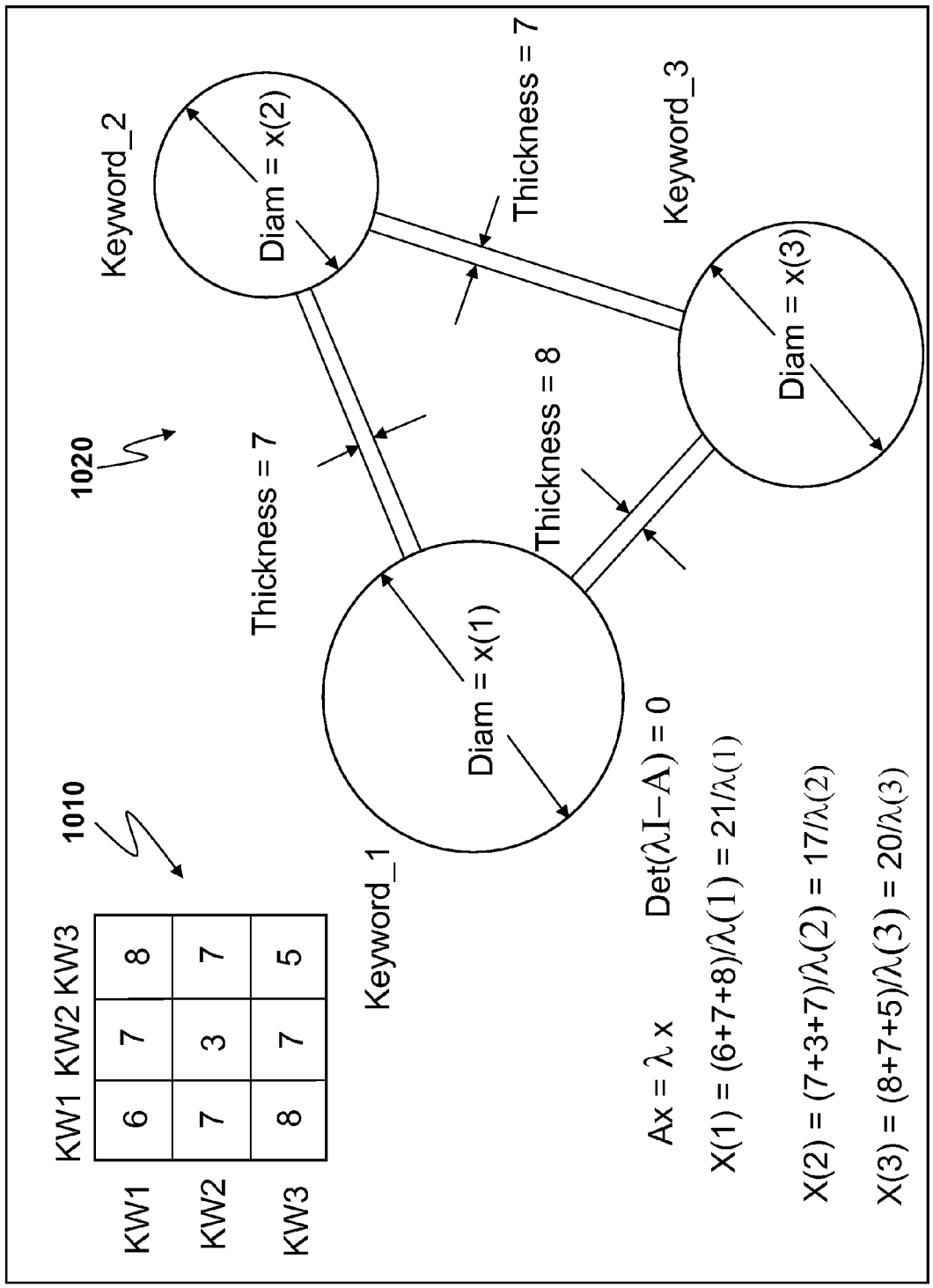
FIG. 10 illustrates a exemplary mapping form a weighted adjacency matrix to a digraph, according to the teachings of the embodiments of the present invention.

In the fourth phase of the exemplary process, FIG. 10 shows the keyword matrix 1010 may be represented as a network map 1020 of keywords indicating the strength of relationships between the most frequently mentioned keywords. The sizes, i.e., relative diameters of the graphic nodes on the network map 1020 may be based on a measure of eigenvector centrality and may be applied graphically to indicate the relative importance the keywords in the text based on co-occurrences. The present example applies eigenvector centrality to reflect the relative importance of a keyword node in the network representation by having the diameter of the node related to the relative importance.

$$x_i = \frac{1}{\lambda} \sum_{j=1}^{N} A_{i,j} x_j \qquad [\text{Eq. 1}]$$

Each keyword may be represented as a node i which may have scored a co-occurrence with a keyword that may be represented as node j. The co-occurrence, co-occurrence frequency, or weighted co-occurrence score may be treated analogously to an adjacency element $A_{i,j}$ of an adjacency matrix [A]. An eigenvector centrality measure for keyword i may be determined by summing the product of the adjacency scores (0 or 1) and connectivity scores (or simply a weighted adjacency score) across the nodes j and then normalizing this sum by the eigenvector or some other constant. Some determinations of centrality may ignore the main diagonal entries and therefore only sum the off-diagonal of the weighted adjacency matrix or narrative network.

The relative width of an arc or link between each pair of keywords may indicate the frequency of the co-occurrence of the keywords, for example, relative to the weighted values as described above. So, the thicker one link is relative to another link, then the higher its weighted link value is relative to the other link. Nodes may be clustered that have strong connection, i.e., the distance between nodes or the lengths of their arcs may be shorter as they are thicker to represent the frequency of co-occurrence. Keywords may be positioned proximate to one another, or clustered, and have the same color node or the same graphical icon on the network map and such clustering may form a main theme or group that consistently appears together in the media coverage. Consistency of appearance may be set by a threshold of arc weight and may include tests across sets of media. That is, the frequency of media sets within which two keywords appear together, the more proximate they may be arranged, whether by indices in a keyword matrix, or grouping in a graphical display of nodes. An example of the generated graphical nodal representation is provided by FIG. 10.

The weighted and arranged keyword matrix may be represented as a graph or network of sized nodes and arc of various thicknesses. Such a graphical display of the weighted and arranged keyword matrix may be termed a narrative network map that may present a semantic perspective of keywords associated with a particular company or brand, or other subject in media coverage analysis. In other words, the narrative network map may visually display the brand image or reputation of the company in the media. The network map may then use a strategic communications development tool to help communications professionals determine the appropriate messaging to support a company's brand marketing efforts.

Figure 11:
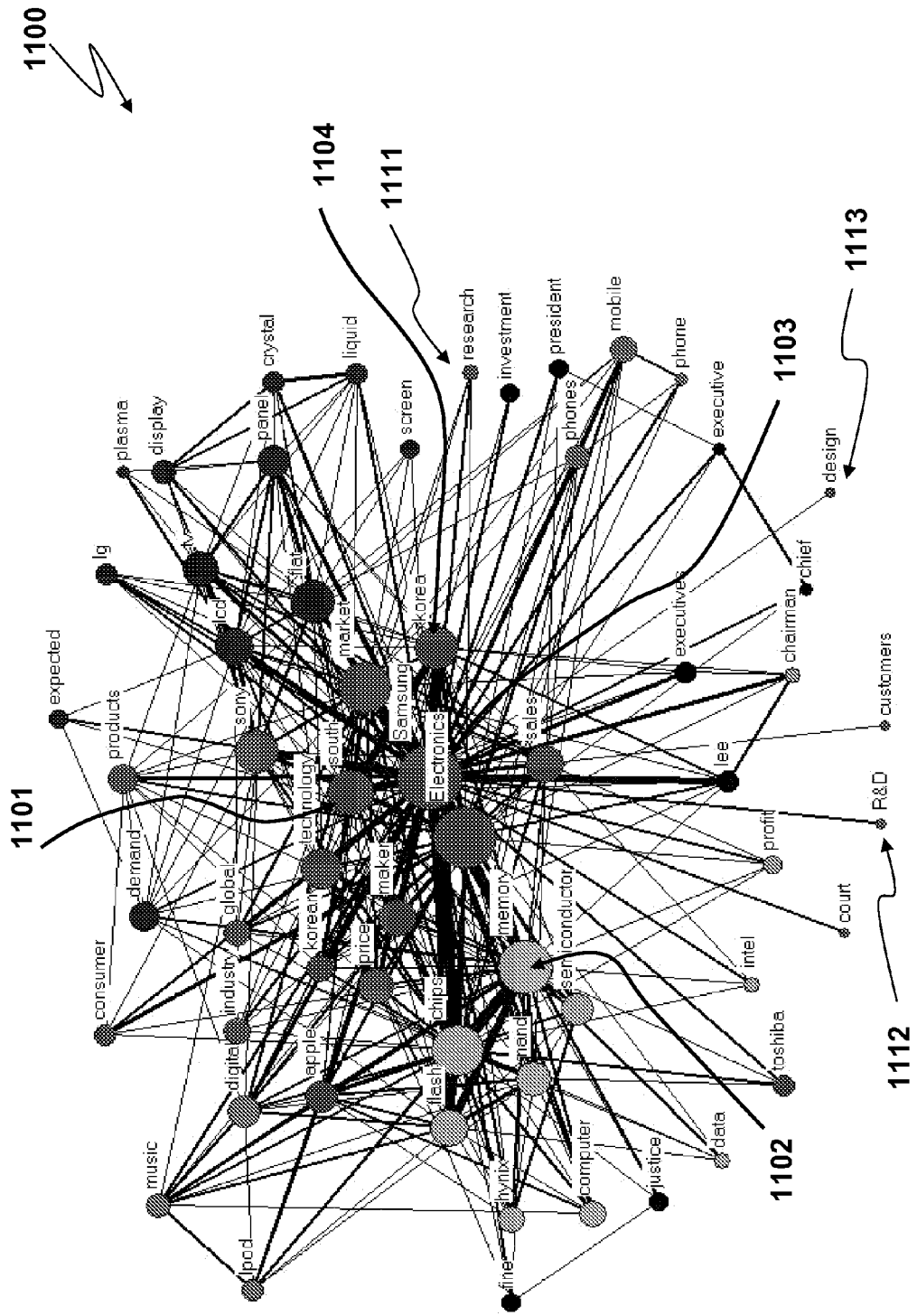
FIG. 11 illustrates an exemplary digraph as a Narrative Network, according to the teachings of the embodiments of the present invention.

As an example, the narrative network map 1100 of FIG. 11 displays six-months of media coverage of the Korean consumer electronics and semiconductor manufacturer, Samsung™. In the Samsung example, the Narrative Network map indicates that Samsung is most closely associated with words such as "technology" 1101, "memory" 1102, "electronics" 1103 and "Korea" 1104 in recent media coverage. Words on the periphery of the network, such as "research," 1111 "R&D" 1112 and "design" 1113 are not closely linked to Samsung in media coverage.

Fifth Phase

The fifth phase of the exemplary process may include utilizing the narrative network map to aid strategic marketing communications development. Once a narrative network map has been created and media perceptions of a brand have been assessed (see FIG. 11), the map is then used in a communications planning process which may be termed a media perception representation process. The Master Narrative™ communications development method involves assessing how a brand is currently perceived in the media (current Master Narrative) and then devising a communications plan to create a desired, or aspirational, Master Narrative in future media. A Master Narrative marketing communications program is designed to either insert or de-emphasize particular nodes on the narrative network. As an example, FIG. 11 indicates that there is a potential strategic communications opportunity for Samsung™ to leverage the messaging theme of "research & design" in their advertising and public relations efforts vis-à-vis the competition. That is, by inducing media to be produced having increased occurrences of the target keywords related in sentences and in paragraphs, a successful induction may be recorded as higher frequency counts in the links between the subject words such as "Samsung" and target words such as "research."

While the "research" and "design" nodes on the narrative network map are not currently strongly associated with the Samsung™ brand, if multiple media placements of the words "research" and "design" could be generated in media articles where Samsung is mentioned, the future network maps would have links, and preferably thick links, between these words and Samsung™. Frequencies of occurrence of such identified keywords as "research" and "development" may be structured in material for seeding to publishers within the textual corpus for the target audience and as represented by the relevant textual media may be shifted (again after applying the above narrative network process phases) in the direction of the goal state as may be represented as a multi-nodal network map of a weighted adjacency matrix or the matrix itself. With sufficient media co-occurrences of these strategic communication seeds or themes, the diameter of the nodes representing "research" and "design" would increase and these growing nodes may be arranged closer to the central brand node of Samsung and form a new communication theme or textual representation of the consumer electronics brand. Conversely, if certain nodes on the network map are not desirable from a brand communications perspective, efforts in the media could be made to discourage the co-occurrence of words such as "Samsung" and "Korea" if Samsung wished to be known more as a global, rather than regional, brand. The Master Narrative™ should be harmonized with the human affinity for the oral traditions of receiving information in the form of a story and the human receptivity to graphic information and messages. Accordingly, the story and Master Narrative should, on an element by element basis reflect one another.

The methods of the present invention may be embodied in a client-server system where the client may indicate the textual corpus and initial keyword. A web-based application enables near real-time interactive node identification functionality. This interactive functionality allows the user to view Narrative Network maps via the web and allows real-time linkage explanation of each node via clicking on a node. By clicking on a node, the node reveals, via pop-up or translucent window, for example, its individual links to other nodes on the map in order to allow isolated analysis of individual storylines associated with a brand, topic or person. Interactive node identification allows the user to see the actual media coverage associated with each node. When the user clicks on a node, the actual media coverage containing that particular word appears in a text box beside the map. Interactive node identification enhances the user's ability to determine the context of each node in a map and may enable the user to assess whether the selected textual corpus is sufficient. Interactive mapping allows the user to re-configure the maps to show only certain nodes relevant to final assessment and prospective direction of textual seeding.

Also, the client-server embodiments of the present invention may include web-based timeline mapping which enables the user to click on a node to read how often that particular word has been mentioned in media coverage, i.e., in the textual corpus as it is updated with additional articles over the course of the continued parsing of media coverage. This allows analysis of a keyword mention by week, or month, to determine the effectiveness of the textual seeding, by for example, public relations or marketing communications initiatives. In other words, timeline mapping enables pre/post assessment of public relations messaging before and after an event like a trade show, or a conference, a press release or an executive engagement with the media.

Exemplary Application

An exemplary process includes establishing the textual corpus. For example, based on the question/business problem to be addressed, text may be collected into a single document or a set of documents for analysis. Text could be from any selected source, e.g., speech transcripts, news stories, news archive databases, web-logs (blogs), website content, and analyst reports. The text to be included in an analysis may be clean of reposted articles, citation information and html coding leaving only the non-redundant article comprising headline and body text.

In the process of parsing, frequently occurring keywords and phrases, company names, acronyms, synonyms and alternate forms of keywords may be noted. Keywords with alternate forms or spellings are flagged so that these words can be counted as a single node/cell on the final map/matrix. Key phrases may also be identified. The parsing process typically generates an initial list of high-frequency words from the text that may be ranked in order of frequency, with the most frequently used words at the top. The high-frequency list and the keywords generated in the previous step may then be combined to form a list of 50 to 120 keywords to map, i.e., to assess co-occurrences of word pairs within the textual corpus and form a matrix and/or network map. The number of keywords included depends on the volume of text, i.e., size of the textual corpus, assessed, the frequency of the keywords and the specific questions, represented by the initial keywords and phrases, to be addressed by the process. While keyword frequency is an important metric in building this list, it is not the only metric used. The process typically avoids, i.e., filters, words such as "and," "is" and "the," because they are often the most frequently mentioned words. Prior to filtering out low-frequency words, the pre-filtered words may be analyzed based on their similarity, e.g., whether in spelling or in meaning, to keywords already selected and they may be retained if the analysis indicates they may aid (e.g., by adding additional descriptiveness) in the co-occurrence assessment of the category or brand being analyzed.

A map or matrix may be built according to the teachings of the present disclosure to identify the key players, i.e., influential persons and/or business entities, in a specific category, and accordingly the process may particularly include as keywords specific companies or individuals to assess their co-occurrences on the map, or in the matrix. By contrast, a map or matrix may be built to assess high-frequency keywords and their co-occurrence in a particular textual corpus, preferring to retain adjective and other descriptive terms and avoid, i.e., filter names of players altogether.

Once the keyword list is identified, computer processing compares each word to every other keyword on the list, giving each word pair a numerical rating based on proximity in the same sentence or paragraph within the text document. Words that are paired in the same sentence together receive greater weight than words appearing in paragraphs together. From these weightings, a weighted adjacency matrix, or keyword matrix is built. Once a keyword matrix, comprising the initial keywords and the high-frequency keyword for example, is built, a graphical depiction such as a Narrative Network map may be fashioned where each keyword is represented by a node and words appearing together in the same sentence or paragraph connected with a line, where the line thickness may represent weighted and combined co-occurrence frequencies for each linked pair of nodes. The resulting web or network is a preliminary Narrative Network map. Once the preliminary matrix or map is built, words having sparse off-diagonal entries, that is, nodes having few or no links, may be eliminated from the matrix/map. Generic words may be eliminated with preference toward words having specific meaning. Through eigenvector-based sub-processing as described above, nodes that form a tightly coupled subsystem, through connections to the same other keywords, may be identified by color groups in a node-colored digraph or rearranged within a matrix to form a sub-matrix.

Although this invention has been disclosed in the context of certain embodiments and examples, it will be understood by those of ordinary skill in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of ordinary skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

APPENDIX

```
Exemplary Parsing Instructions (In C#[sharp])
See C#Programming Guide available from Microsoft
( http://msdn2.microsoft.com/en-us/library/67ef8sbd.aspx )
using System;
using System.Data;
using System.Data.SqlClient;
using System.Data.SqlTypes;
using Microsoft.SqlServer.Server;
struct WordInfo {
   public readonly System.String word;
   public readonly System.Int32 para;
   public readonly System.Int32 sentence;
   public readonly System.Int32 in_quote;
   public readonly System.Int32 character_pos;
   public WordInfo(
      System.String word,
      System.Int32 para,
      System.Int32 sentence,
      System.Int32 in_quote,
      System.Int32 character_pos) {
      this.word = word;
      this.para = para;
      this.sentence = sentence;
      this.in_quote = in_quote;
      this.character_pos = character_pos;
   }
} //end struct
public partial class UserDefinedFunctions {
   [Microsoft.SqlServer.Server.SqlFunction(
      FillRowMethodName = "GetRow",
      TableDefinition = "word nvarchar(max),para int,sentence int,in_quote int,character_pos int")]
   public static System.Collections.IEnumerable wesp_nn_parse_coverage(
      System.Data.SqlTypes.SqlString coverage) {
      System.String coverage_text = coverage.Value;
      System.String replaceRegEx =
@"\u0009|\u0023|\u0024|\u0025|\u0026|\u0027|\u0028|\u0029|\u002A|\u002B|\u002C|\u002C
|\u002D|\u002F|\u003A|\u003B|\u003C|\u003D|\u003E|\u0040|\u005B|\u005C|\u005D
|\u005E|\u005F|\u0060|\u007B|\u007C|\u007D|\u007E|\u0081|\u009D|\u00A0|\u00A1|\u00A2
|\u00A3|\u00A5|\u00A6|\u00A7|\u00A8|\u00A9|\u00AA|\u00AB|\u00AC|\u00AD|\u00AE
|\u00AF|\u00B0|\u00B1|\u00B2|\u00B3|\u00B4|\u00B5|\u00B6|\u00B7|\u00B9|\u00BA
|\u00BB|\u00BC|\u00BD|\u00BE|\u00BF|\u00D7|\u00DF|\u00E0|\u00E1|\u00E2|\u00E3
|\u00E4|\u00E5|\u00E6|\u00E7|\u00E8|\u00E9|\u00EA|\u00EB|\u00EC|\u00ED|\u00EE
|\u00EF|\u00F0|\u00F1|\u00F2|\u00F3|\u00F4|\u00F5|\u00F6|\u00F8|\u00F9|\u00FA|\u00FB
|\u00FC|\u00FD|\u00FE|\u00FF|\u0153|\u017E|\u0192|\u02C6|\u02DC|\u2013|\u2014|\u2018
|\u2019|\u201A|\u201C|\u201D|\u201E|\u2020|\u2022|\u2026|\u2030|\u2039|\u203A
|\u20AC|\u2122";
      //|\u0022| ---> "
      //|\u002E| ---> .
      //|\u003F| ---> ?
      //|\u0021| ---> !
```

APPENDIX-continued

```
//|u0030|u0031|u0032|u0033|u0034|u0035|u0036|u0037|u0038|u0039| ---> 0-9
    System.Collections.Generic.List<WordInfo> list = new
System.Collections.Generic.List<WordInfo>( );
    System.Int32 characterPosition;
    System.Int32 paraCount;
    System.Int32 sentenceCount;
    System.Int32 quoteCount;
    System.Int32 inQuote;
    System.Byte[ ] stringBytes;
    System.String[ ] words;
    System.Boolean written = false;
    characterPosition = 0;
    paraCount = 0;
    sentenceCount = 0;
    quoteCount = 0;
    //get rid of junik characters, normalize sentence terminators to period, normalize
spaces, normalize paragraphs
    coverage_text =
System.Text.RegularExpressions.Regex.Replace(coverage_text.ToLower( ),
replaceRegEx, "");
    coverage_text = System.Text.RegularExpressions.Regex.Replace(coverage_text,
"|u003F+|u0021+|u002E+", "|u002E");
    coverage_text = System.Text.RegularExpressions.Regex.Replace(coverage_text,
"|u0020+", "|u0020");
    coverage_text = System.Text.RegularExpressions.Regex.Replace(coverage_text,
"|u000A+", "|u0020|u000A");
    //split on space
    words = System.Text.RegularExpressions.Regex.Split(coverage_text, @"|u0020");
    foreach (System.String word in words) {
        inQuote = 0;
        written = false;
        stringBytes = System.Text.Encoding.Unicode.GetBytes(word);
        for (System.Int32 x = 0; x < stringBytes.Length; x += 2) {
            if (stringBytes[x] == 46) {
                sentenceCount++;
            }
            if (stringBytes[x] == 34) {
                quoteCount++;
            }
            if (quoteCount % 2 != 0) {
                inQuote = 1;
            }
            if (stringBytes[x] == 10) {
                paraCount++;
            }
            if (stringBytes[x] != 10 && stringBytes[x] != 46 && stringBytes[x] != 34) {
                if (!written) {
                    WordInfo wordInfo = new WordInfo(
                        System.Text.RegularExpressions.Regex.Replace(word,
@"|u0022|u002E|u000A", ""),
                    paraCount,
                    sentenceCount,
                    inQuote,
                    characterPosition);
                    list.Add(wordInfo);
                    written = true;
                } //end written check
                if (x % 2 == 0) {
                    characterPosition++;
                }
            } //end special character check
        } //end character
        characterPosition++;
    } //end words loop
    return (list);
} //end method
public static void GetRow(
    System.Object obj,
    out System.Data.SqlTypes.SqlString word,
    out System.Data.SqlTypes.SqlInt32 para,
    out System.Data.SqlTypes.SqlInt32 sentence,
        out System.Data.SqlTypes.SqlInt32 in_quote,
        out System.Data.SqlTypes.SqlInt32 character_pos) {
    WordInfo wordInfo = (WordInfo)(obj);
```

APPENDIX-continued

```
    word = wordInfo.word;
    para = wordInfo.para;
    sentence = wordInfo.sentence;
    in_quote = wordInfo.in_quote;
    character_pos = wordInfo.character_pos;
  } //end method
} //end class
```

What is claimed is:

1. A computer implemented method of characterizing a textual corpus state comprising:
 selecting a set of initial text publishers comprising at least one text publisher;
 defining a textual corpus comprising at least one textual output from a text publisher of the selected set of initial publishers;
 deriving a characterized textual corpus state comprising:
  a set of word characterizations; each word characterization comprising: a word and; an associated word frequency of occurrence value within the defined textual corpus; and
  a set of word pair characterizations; each word pair characterization comprising: a word pair, each word of the word pair being a member of the set of word characterizations, and; a first associated word pair frequency of co-occurrence value within a first defined text length of the defined textual corpus;
 generating a matrix comprising: a plurality of main diagonal terms each of the main diagonal terms comprising a keyword frequency value; and at least one off-diagonal term comprising a co-occurrence frequency value; and
 generating a digraph having a node for each main diagonal term and an arc for the at least one off-diagonal term, wherein the each nodal diameter is a function of the keyword frequency value.

2. The method of claim 1 wherein each word pair characterization further comprises a second associated word pair frequency of co-occurrence value within a second defined text length of the defined textual corpus.

3. The method of claim 1 wherein the first defined text length is a sentence and the second defined text length is a paragraph.

4. The method of claim 1 further comprising:
 storing the characterized textual corpus state;
 deriving a second characterized textual corpus state; and
 generating an input to the set of initial text publishers based on the difference between the stored characterized textual corpus state and the derived second characterized textual corpus state.

5. The method of claim 1 further comprising:
 providing the target state of the characterized textual corpus comprising:
  a set of keyword characterizations; each keyword characterization comprising: a keyword and; an associated keyword frequency of occurrence value within the defined textual corpus; and
  a set of keyword pair characterizations; each keyword pair characterization comprising: a keyword pair, each keyword of the keyword pair being a member of the set of keyword characterizations, and; a first associated keyword pair frequency of co-occurrence value within the first defined text length of the defined textual corpus; and
 generating an input to the set of initial text publishers based on the difference between the characterized textual corpus state and the target state of the characterized textual corpus state.

6. The method of claim 1 further comprising after the step of selecting a set of initial text publishers comprising at least one text publisher:
 transmitting a test textual input to the selected set of initial text publishers;
 sampling output of at least one of the initial text publishers of the selected set of initial text publishers;
 sampling output of a set of second tier text publishers;
 differencing the state of the test textual input and the state of the output of the initial text publishers and deriving a fidelity index;
 differencing the sampled output state of the initial text publishers and the state of the second tier publishers and deriving a propagation index; and
 eliminating from the set of initial text publishers at least one initial text publisher based on at least one of: the associated fidelity index and the associated propagation index.

7. The method of claim 1 wherein the step of deriving a characterized textual corpus state further comprises filtering parsed words from the textual corpus to yield at least one word for the set of word characterizations.

8. The method of claim 1 wherein the step deriving a characterized textual corpus state further comprises defining at least one keyword for the set of word characterizations.

9. The method of claim 1 further comprising adding to the initial keywords at least one high-frequency word and repeating the steps of
 deriving from the textual corpus the assessed textual corpus state;
 generating a new difference; and
 transmitting an new textual input for the selected set of initial text publishers based on the difference.

10. The method of claim 1 further comprising after the step of selecting a set of initial text publishers comprising at least one text publisher:
 transmitting a test textual input to the selected set of initial text publishers;
 sampling output of at least one of the initial text publishers of the selected set of initial text publishers;
 sampling output of a set of second tier text publishers;
 differencing the state of the test textual input and the state of the output of the initial text publishers and deriving a fidelity index;
 differencing the sampled output state of the initial text publishers and the state of the second tier publishers and deriving a propagation index; and
 eliminating from the set of initial text publishers at least one initial text publisher based on at least one of: the associated fidelity index and the associated propagation index.

11. The method of claim 10 further comprising adding to the initial keywords at least one high-frequency word and repeating the steps of deriving from the textual corpus the assessed textual corpus state;

generating a new difference; and transmitting an new textual input for the selected set of text publishers based on the difference.

12. A computer implemented method of adapting a characterized textual corpus state to a target state comprising:

(a) selecting a set of initial text publishers comprising at least one text publisher;

(b) defining a textual corpus comprising at least one textual output from a publisher of the selected set of initial publishers;

(c) providing the target state of the textual corpus comprising:

a set of initial keywords; each initial keyword including a subset comprising an associated initial keyword frequency of occurrence from within the defined textual corpus;

a set of frequencies of within-sentence co-occurrence of pairs of initial keywords from within the defined textual corpus; and a set of frequencies of within-paragraph co-occurrence of pairs of initial keywords from within the defined textual corpus;

(d) deriving from the textual corpus the assessed textual corpus state comprising parsing the textual corpus and filtering the parsed textual corpus yielding the assessed textual corpus state comprising:

a set of derived keywords; each derived keyword including a subset comprising an associated derived keyword frequency of occurrence within the defined textual corpus;

a set of high-frequency words; each high-frequency word including an associated high-frequency word frequency of occurrence within the defined textual corpus;

a set of frequencies of within-sentence co-occurrence of pairs of words within the defined textual corpus, the pairs of words selected from a combined set of words comprising the set of derived keywords and the set of high-frequency words; and a set of frequencies of within-paragraph co-occurrence of pairs of words within the defined textual corpus, the pairs of words selected from the combined set of words;

(e) generating a difference based on differencing at least one of: (a) the derived keyword frequency subset and the initial keyword frequency subset; (b) the set of within-sentence co-occurrence of pairs of derived keywords and the set of within-sentence co-occurrence of pairs of initial keywords; and (c) the set of within-paragraph co-occurrence of pairs of derived keywords and the set of within-paragraph co-occurrence of pairs of initial keywords; and (f) transmitting a textual input for the selected set of initial text publishers based on the difference.

13. A computing system comprising a processor and addressable memory and having access to a textual corpus comprising at least one textual output from a text publisher, the computing system comprising:

means for deriving a characterized textual corpus state comprising:

a set of word characterizations; each word characterization comprising: a word and; an associated word frequency of occurrence value within the defined textual corpus; and a set of word pair characterizations; each word pair characterization comprising: a word pair, each word of the word pair being a member of the set of word characterizations, and; a first associated word pair frequency of co-occurrence value within a first defined text length of the defined textual corpus; and means for generating a matrix comprising: a plurality of main diagonal terms each of the main diagonal terms comprising a keyword frequency value; and at least one off-diagonal term comprising a co-occurrence frequency value; and means for generating a digraph having a node for each main diagonal term and an arc for the at least one off-diagonal term, wherein the each nodal diameter is a function of the keyword frequency value.

14. A computing system of claim 13 further comprising:

means for deriving a second characterized textual corpus state; and means for generating an input to the set of initial text publishers based on the difference between a stored characterized textual corpus state and the derived second characterized textual corpus state.

15. The computing system of claim 13 further comprising:

means of generating an input to a text publisher of the textual corpus based on the difference between the characterized textual corpus state and the target state of the characterized textual corpus state wherein the target state of the characterized textual corpus comprises:

a set of keyword characterizations; each keyword characterization comprising: a keyword and; an associated keyword frequency of occurrence value within the defined textual corpus; and a set of keyword pair characterizations; each keyword pair characterization comprising: a keyword pair, each keyword of the keyword pair being a member of the set of keyword characterizations, and; a first associated keyword pair frequency of co-occurrence value within the first defined text length of the defined textual corpus.

* * * * *

UNITED STATES PATENT AND TRADEMARK OFFICE
CERTIFICATE OF CORRECTION

PATENT NO. : 8,271,266 B2  
APPLICATION NO. : 11/846866  
DATED : September 18, 2012  
INVENTOR(S) : Gallagher et al.

Page 1 of 1

It is certified that error appears in the above-identified patent and that said Letters Patent is hereby corrected as shown below:

Column 3, line 40
replace "form" with "from"

Column 6, line 34
replace "o" with "or"

Signed and Sealed this
Fourth Day of December, 2012

David J. Kappos
*Director of the United States Patent and Trademark Office*